(12) United States Patent
Kim et al.

(10) Patent No.: US 6,638,152 B1
(45) Date of Patent: Oct. 28, 2003

(54) DIAMOND BLADE HAVING SEGMENT TYPE CUTTING TIP FOR USE IN CUTTING, GRINDING OR DRILLING APPARATUS

(75) Inventors: Soo Kwang Kim, Irvine, CA (US); So Young Yoon, Seoul (KR); Chang Hyun Lee, Pyongtaek-Si (KR)

(73) Assignees: Ehwa Diamond, Ind., Co., Ltd. (KR); General Tool, Inc., Irvine, CA (US)

( * ) Notice: Subject to any disclaimer, the term of this patent is extended or adjusted under 35 U.S.C. 154(b) by 0 days.

(21) Appl. No.: 09/786,304

(22) PCT Filed: Sep. 3, 1999

(86) PCT No.: PCT/KR99/00515

§ 371 (c)(1),
(2), (4) Date: May 31, 2001

(87) PCT Pub. No.: WO00/13869

PCT Pub. Date: Mar. 16, 2000

(30) Foreign Application Priority Data

Sep. 3, 1998 (KR) .............................. 98-36323

(51) Int. Cl.⁷ ................................................ B23F 21/03
(52) U.S. Cl. ..................... 451/541; 451/542; 451/548
(58) Field of Search ................. 451/541, 544, 451/547, 543, 542, 546, 548, 550

(56) References Cited

U.S. PATENT DOCUMENTS

| | | | |
|---|---|---|---|
| 2,361,492 A | | 10/1944 | Pare |
| 2,811,960 A | | 11/1957 | Fessel |
| 3,048,160 A | * | 8/1962 | Griffen et al. |
| 3,049,843 A | * | 8/1962 | Christensen |
| 3,802,130 A | * | 4/1974 | Lindenbeck |
| 3,898,772 A | * | 8/1975 | Sawluk ......................... 125/15 |
| 4,208,843 A | * | 6/1980 | Amaki et al. |
| 4,291,667 A | | 9/1981 | Eichenlaub et al. ........... 125/15 |
| 4,739,745 A | * | 4/1988 | Browning ..................... 125/15 |
| 5,868,125 A | * | 2/1999 | Maoujoud ..................... 125/15 |
| 6,110,031 A | * | 8/2000 | Preston ........................ 451/541 |

FOREIGN PATENT DOCUMENTS

| | | |
|---|---|---|
| DE | 2213811 A | 7/1973 |
| DE | 2318378 A | 9/1974 |
| DE | 2438601 A1 | 2/1976 |
| GB | 1010318 A | 11/1965 |

* cited by examiner

*Primary Examiner*—Eileen P. Morgan
(74) *Attorney, Agent, or Firm*—Vidas, Arrett & Steinkraus

(57) ABSTRACT

A diamond tool having segment type cutting tip for cutting, grinding or drilling workpieces. The diamond tool comprising a plurality of segment type cutting tips circumferentially fixed on the wheel of the diamond tool, each of which has at least two diamond layers longitudinally disposed parallel with the rotation direction of the diamond tool, and capable of effectively cutting, grinding or drilling workpieces as forming at least two microscopic linear cutting groves in the workpieces when cutting operation.

8 Claims, 16 Drawing Sheets

DIAMOND BLADE HAVING SEGMENT TYPE CUTTING TIP FOR USE IN CUTTING, GRINDING OR DRILLING APPARATUS

BACKGROUND OF THE INVENTION

The present invention relates to a diamond tool for cutting, grinding or drilling workpieces such as brick, concrete, granite, marble, etc., and more particularly to a diamond tool comprising a plurality of segment type cutting tips circumferentially fixed on the wheel of the diamond tool, each of which has at least two diamond layers formed the same plane of the wheel of the diamond tool, and capable of cutting, grinding or drilling workpieces as forming at least two microscopic linear cutting grooves in the workpieces when cutting operation.

A prior art diamond tool 1 for cutting workpieces, as shown in FIGS. 1 to 3, comprises a steel wheel body 2 whose center hole is connected with a shaft of an electrical motor, and a plurality of cutting tips 4 fixed circumferentially on the steel wheel body 2. Here, the steel wheel body 2 has a plurality of discharge slots 3 formed between the cutting tips 4, which are gathering and discharging the minute chips generated from the workpiece during the cutting operation.

The cutting tips 4 are fabricated by mixing abrasive materials such as diamond particles, metal powder composing of cobalt, nickel, bronze, copper, etc., or resin or ceramic, and then by pressing the mixed materials in a predetermined mold, thereby forming the same, as shown in FIG. 2. Because the cutting tips 4 are manufactured from the mixture mentioned above, the diamond particles 8 are randomly distributed in the one of both outer sides and on the surfaces of the cutting tips 4, as shown in FIG. 3A.

When the prior art diamond tool 1 rotates to cut or grind the workpiece, both outer surfaces of each cutting tip 4 contacts with corresponding surface of the workpieces and forms a cutting slot 6, as shown in FIG. 3B.

According as the prior art diamond tool 1 rotates, the chips are produced in cutting slot 6 from the workpiece and gathered in the discharge slots 3 of the steel wheel body 2. Then, the chips gathered in the discharged slots 3 are discharged outside from the steel wheel body 2.

Therefore, the prior art diamond tool 1 can effectively cut, grind or drill the workpieces as the discharge slots 3 formed in the steel wheel discharge the minute chips from the cutting slot 6 to the outside of the workpiece. However, since the cutting tip shape of the prior art diamond tool is formed like a bar and it includes with a uniformly mixed composition, all the surfaces of the cutting tip 4 contact with the workpieces to cut, grind or drill. Especially, both the edges of an both outer surfaces contact with the side walls and the bottom of cutting slot 6 during the cutting operation are defaced faster than the center surface of the cutting tip.

Accordingly, the contacting area of the cutting tip is enlarged and also increases the resistance of workpieces 5, thereby decreasing the cutting rate and the life of the diamond tool. Further, since the chip size produced during the cutting operation is very minute, most of the chips are possibly remained in the cutting slot 6 of the workpieces 5 and prevents both outer surfaces of the cutting tip 4 from contacting to the workpiece, or the bottom of the cutting slot 6, thereby decreasing the cutting rate of the diamond tool.

Also, the prior art diamond tool has the disadvantages in that the minute chips discharged from cutting slot 6 are dispersed in the air, and causes the bad affects to the worker and the contamination of environment.

SUMMARY OF THE INVENTION

It is an object of the present invention to provide a diamond tool for cutting, grinding or drilling workpieces such as brick, concrete, granite, marble, etc., having segment type cutting tips comprising a plurality of diamond layer cutting tips, each of which at least two diamond layers are longitudinally disposed along the rotation direction of the tool to form at least two microscopic cutting grooves in the workpieces during cutting operation and thereby to cause portions of workpieces between the cutting grooves to be easily crushed by non-diamond portions of the diamond layer cutting tips to enhance cutting rate of the tool.

It is another object of the present invention to provide a diamond tool for an apparatus such as cutting saw machine, grinding wheel machine, and core drilling machine, having a structure in which a segment type cutting tip is able to produce cutting chips with relatively large sizes during cutting operation so that those chips are easily discharged outside with reducing the friction with the segment type cutting tip of the tool, thereby to increase cutting rate and to prevent the chips from dispersing in the air and causing a bad affects to a worker and the contamination of environment.

It is the other object of the present invention to provide a diamond tool for an apparatus such as cutting saw machine, grinding wheel machine, and core drilling machine, having segment type cutting tips comprising a plurality of diamond layer cutting tips, each of which diamond particles in diamond layer thereof are distributed in a given pattern to reduce the amount of diamond particles used and thereby reduce the manufacturing cost of tool.

To accomplish these objects, a diamond tool having segment type cutting tip for use in apparatus for cutting, grinding or drilling workpieces according to the present invention comprises a wheel body connected with a shaft of electric motor, and segment type cutting tip for cutting, grinding or drilling workpieces comprising a plurality of diamond layer cutting tips disposed at predetermined intervals along the circumference of wheel body, each of diamond layer cutting tips having at least two diamond layers longitudinally disposed parallel with the rotation direction of the tool in which diamond particles are included, and non-diamond portion disposed between the diamond layers in which diamond particles are not included.

In this embodiment of the present invention, the segment type cutting tip further includes a plurality of non-diamond layer cutting tips, each of which diamond particles are randomly distributed in one of both outer sides and surfaces thereof, and the non-diamond layer cutting tips and diamond layer cutting tips are alternatively disposed each other on the circumference of wheel body.

Further, diamond particles in each diamond layer of diamond layer cutting tips are distributed in a given pattern or arrangement such a single or double layer figure with grid shaped spots.

Also, in the non-diamond portion of each diamond layer cutting tip, diamond particles can be distributed in the density lower than that of diamond layers of diamond layer cutting tips or non-diamond layer cutting tips.

In another embodiment of the present invention, a diamond tool for cutting, grinding or drilling workpieces comprises a wheel body connected with a shaft of electric motor, and segment type cutting tip for cutting, grinding or drilling workpieces comprising a plurality of diamond layer cutting tips disposed at predetermined intervals on the circumference of wheel body, each of diamond layer cutting tips having non-diamond portion including a depressed portion disposed in the center of one of both outer surfaces thereof and cutting portions disposed in both edges of the other of both outer surfaces thereof, and a plurality of diamond layers longitudinally disposed parallel with the rotation direction of the tool respectively on bottom surfaces of cutting portions of non-diamond portion and both outer surfaces of non-diamond portion of diamond layer cutting tips divided or reduced by depressed portion and cutting portions thereof.

In this embodiment of the present invention, diamond layer cutting tips are disposed on the circumference of wheel body so that depressed portion and cutting portions thereof are alternatively directed to both outer sides.

Also, bottom surfaces of cutting portions of non-diamond portion are positioned in the plane forming the center between both outer surfaces of non-diamond portion of diamond layer cutting tips to let diamond layers disposed thereon to form one cutting line during the cutting operation of tool.

In other embodiment of the present invention, a diamond tool for use in apparatus for cutting, grinding or drilling workpieces comprises a wheel body connected with a shaft of electric motor, and segment type cutting tip for cutting, grinding or drilling workpieces comprising a plurality of diamond layer cutting tips disposed at predetermined intervals on the circumference of wheel body, each of diamond layer cutting tips having non-diamond portion including at least one depressed portion disposed in one of both outer surfaces or/and the other of both outer surfaces thereof, and a plurality of diamond layers longitudinally disposed parallel with the rotation direction of the tool respectively on bottom surface of depressed portion of non-diamond portion and one of both outer surfaces or/and the other of both outer surfaces of non-diamond portion of diamond layer cutting tips divided or/and not divided by depressed portion thereof.

In the embodiment of the present invention, diamond layer cutting tips have four both depressed portions which are disposed to cross each other at predetermined intervals in both outer surfaces thereof.

It is desirable that the depth of all bottom surfaces of depressed portions of both outer surfaces of non-diamond portion is a half of the thickness of diamond layer cutting tip to let diamond layers disposed thereon to form one linear cutting line during the cutting operation of tool.

However, the depth of bottom surfaces of depressed portions of each both outer surfaces of non-diamond portion can be less than a half of the thickness of non-diamond portion of diamond layer cutting tip to let diamond layers disposed thereon to form at least two linear cutting lines during the cutting operation of tool.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

In several embodiments of this invention described below with reference to the accompanying drawings, the invention is applied to a cutting saw machine or a core drilling machine.

Figure 4A:
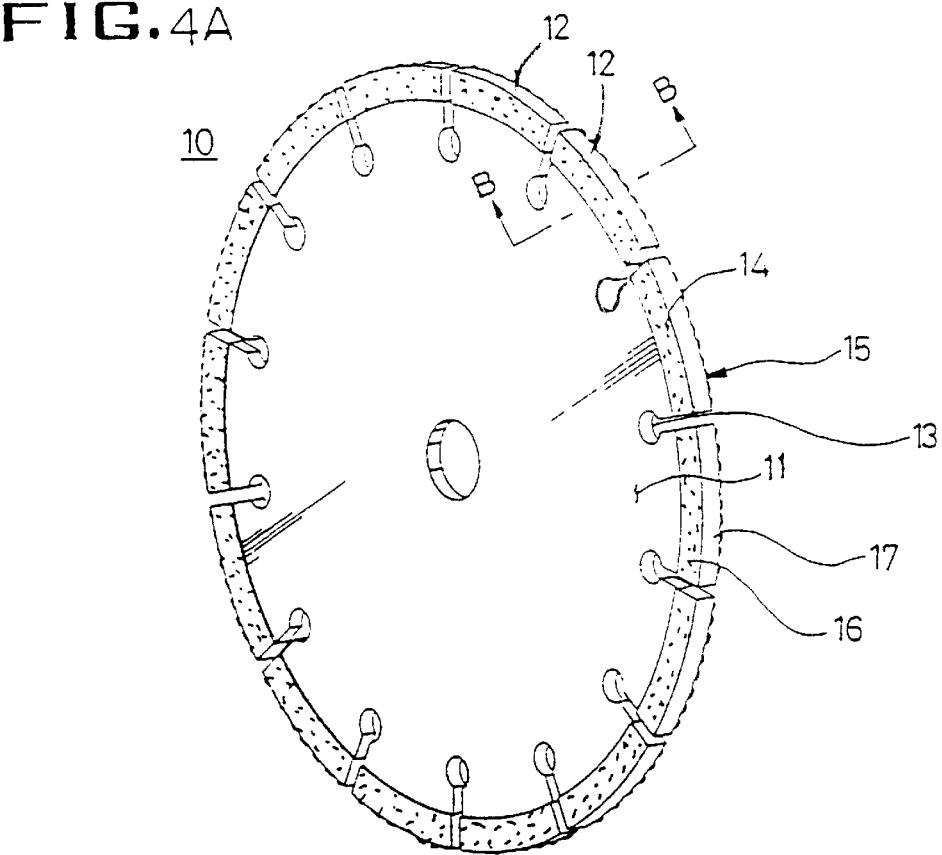
FIG. 4A is a perspective view of the diamond tool with segment type cutting tips for cutting and grinding workpieces according to the present invention, including a plurality of diamond layer cutting tips, each of which two diamond layers are longitudinally disposed respectively in both outer surfaces of the non-diamond portion of each diamond layer cutting tip thereof along the rotation direction of the tool to form two microscopic linear cutting grooves in the workpieces during the cutting operation.
Figure 4B:
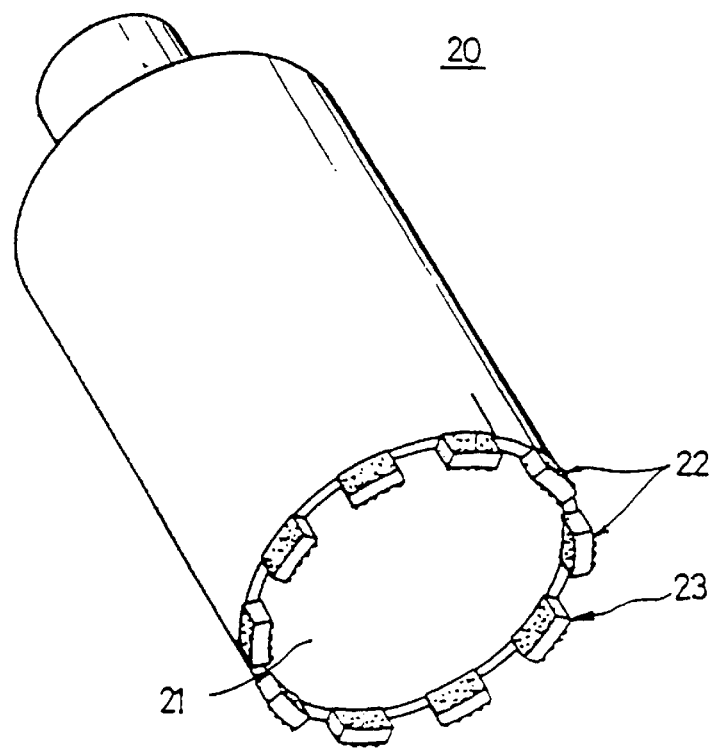
FIG. 4B is a perspective view of the diamond tool with segment type cutting tips for drilling workpieces according to the present invention.

Referring to FIGS. 4A and 4B, there are illustrated diamond tools 10 and 20 according to one preferred embodiment of the present invention for cutting, grinding and drilling workpieces.

In here, since each of the diamond tools 10 and 20 for cutting saw and core drilling machines has the same structure except that the wheel bodies 11 and 21 have respectively disk and cylinder shapes, the diamond tool 10 for cutting saw machine will be explained as below.

sThe diamond tool 10 for cutting saw machine comprises a wheel body 11 connected with a shaft of an electrical motor having a plurality of discharge slots 13 for receiving and discharging minute chips produced during cutting operation, and a plurality of segment type cutting tips 12 for cutting and grinding workpieces disposed circumferentially on the wheel body 11 between the discharge slots 13.

The segment type cutting tips 12 are disposed at predetermined intervals on the circumference of the wheel body 11.

Figure 1:
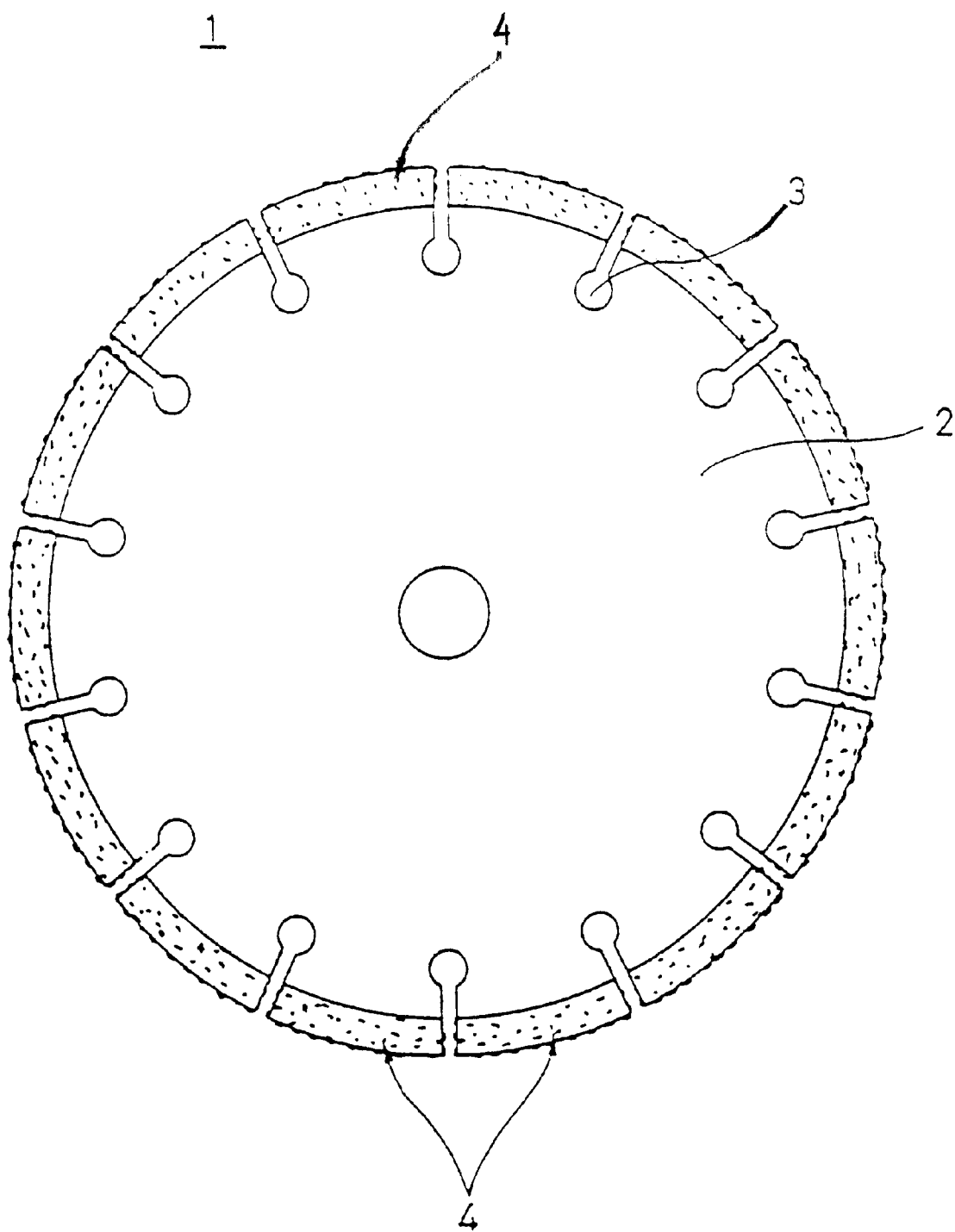
FIG. 1 is a front view of the prior-art diamond tool with segment type cutting tips for cutting, grinding or drilling workpieces.
Figure 2:
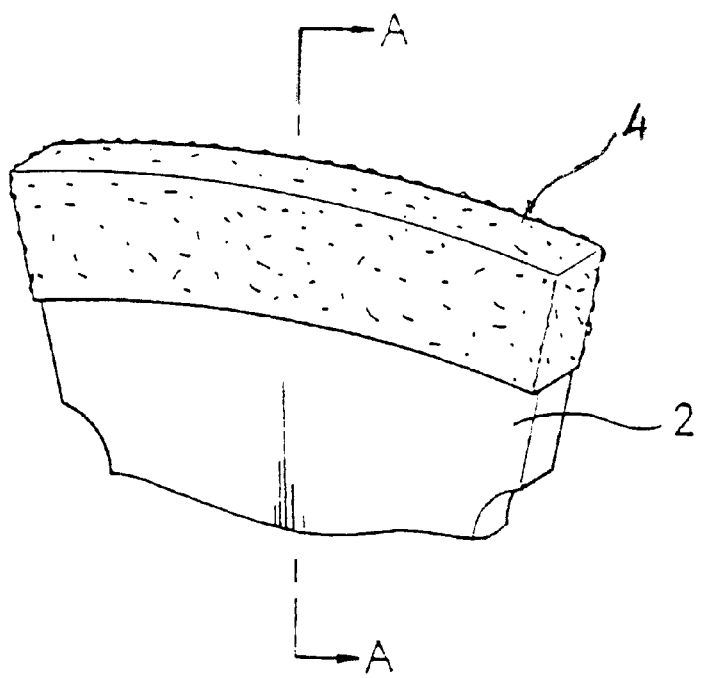
FIG. 2 is a partial perspective view of the prior-art diamond tool shown in FIG. 1.
Figure 3A:
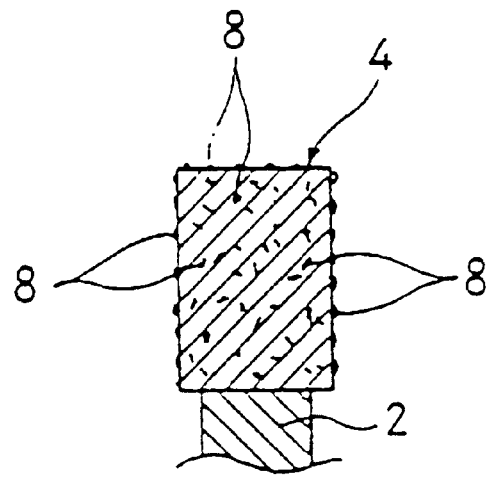
FIG. 3A is a partial cross-sectional view of the prior-art diamond tool taken along line A—A of FIG. 2.
Figure 3B:
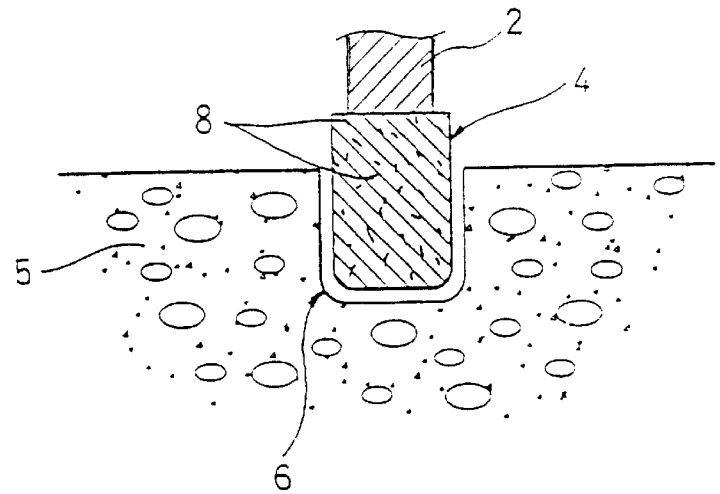
FIG. 3B is a partial cross-sectional view of the prior-art diamond tool during the cutting operating.
Figure 5B:
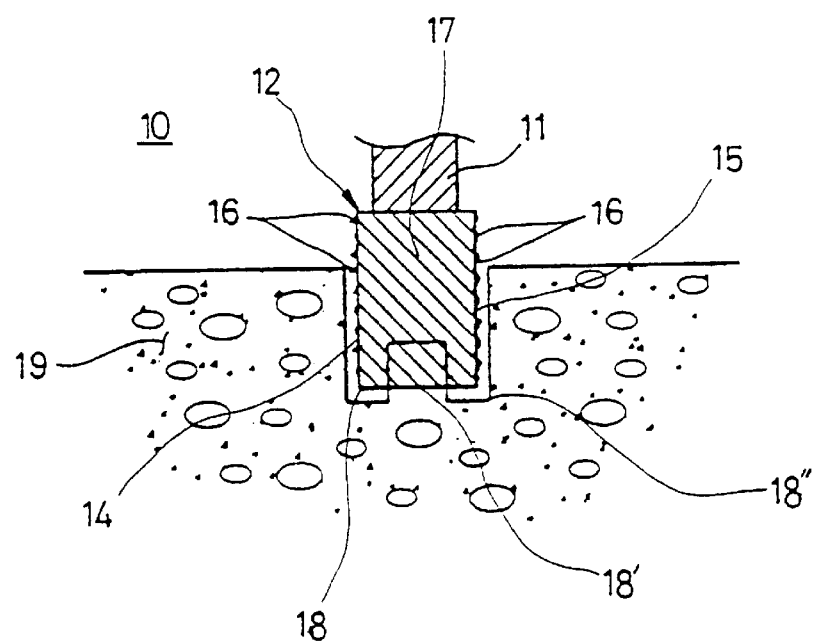
FIG. 5B is a partial cross-sectional view of the diamond tool with segment type cutting tips of the present invention shown in FIG. 4A or 4B when the diamond tool is operating.
Figure 5A:
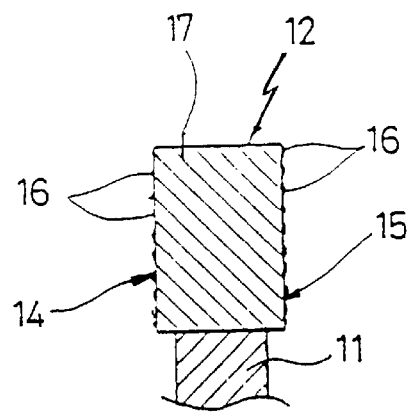
FIG. 5A is a partial cross-sectional view of the diamond tool with segment type cutting tips of the present invention taken along line B—B of FIG. 4A.

Each of the segment type cutting tip 12 is composed of two thin diamond layers 14 and 15 longitudinally disposed respectively in both outer surfaces thereof parallel with the rotation direction of the diamond tool 10, and a non-diamond portion 17 disposed between the two diamond layers 14 and 15 as shown in FIGS. 5A and 5B.

The thin diamond layers 14 and 15 are composed of particles of abrasive material such as diamond, metal powder composing of cobalt, nickel, bronze, copper, etc., or particles of resin or ceramic.

The diamond particles 16 in the thin diamond layers 14 and 15 are randomly distributed therein, or in a predetermined pattern or arrangement such a single or double layer with grid shaped spots to reduce the amount of diamond particles used.

Figure 8A:
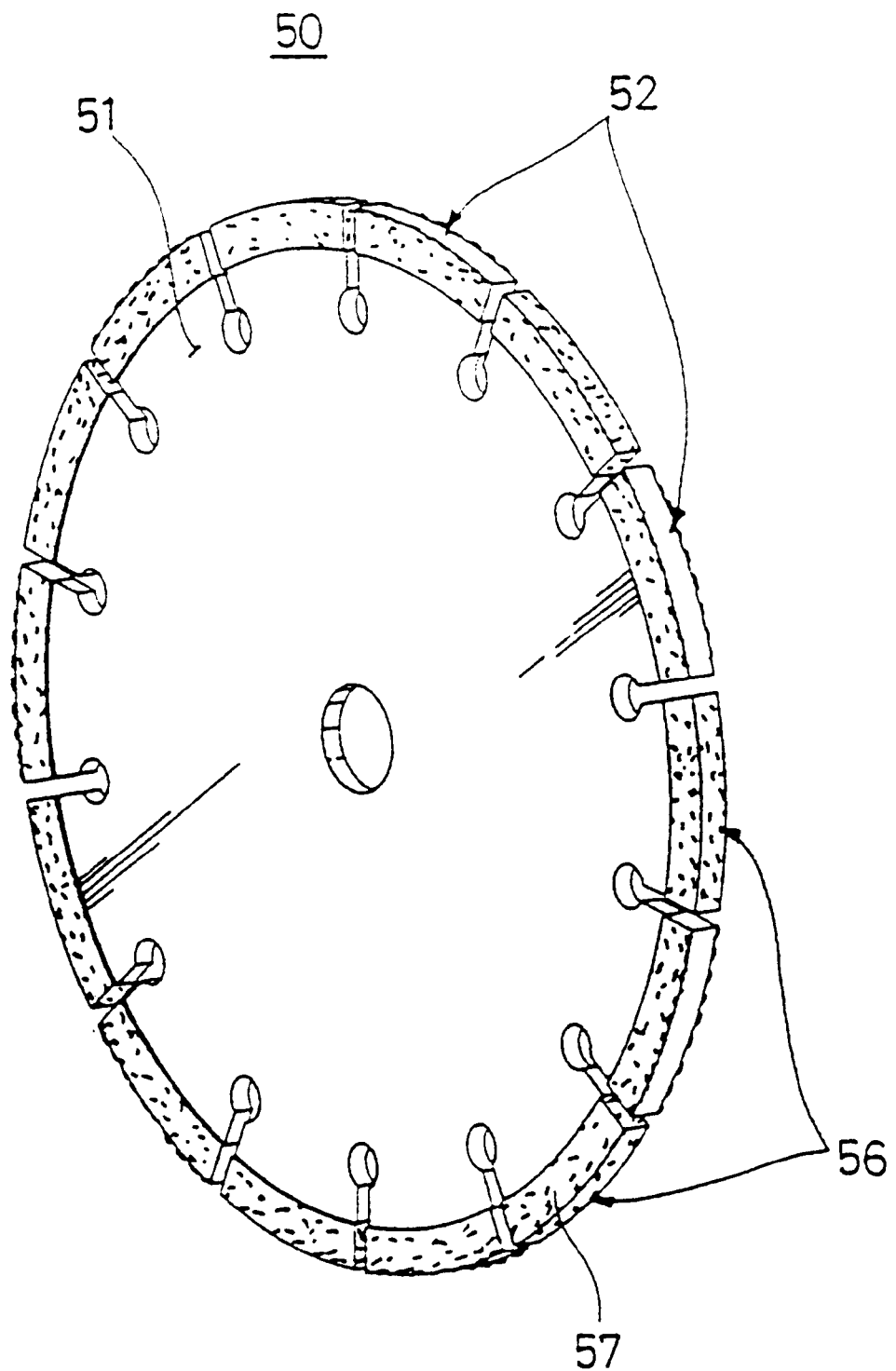
FIG. 8A is a perspective view of a diamond tool with segment type cutting tips for cutting and grinding workpieces according to the present invention, which includes the non-diamond layer cutting tips alternatively disposed together with the diamond layer cutting tips on the circumference of the wheel body.
Figure 8B:
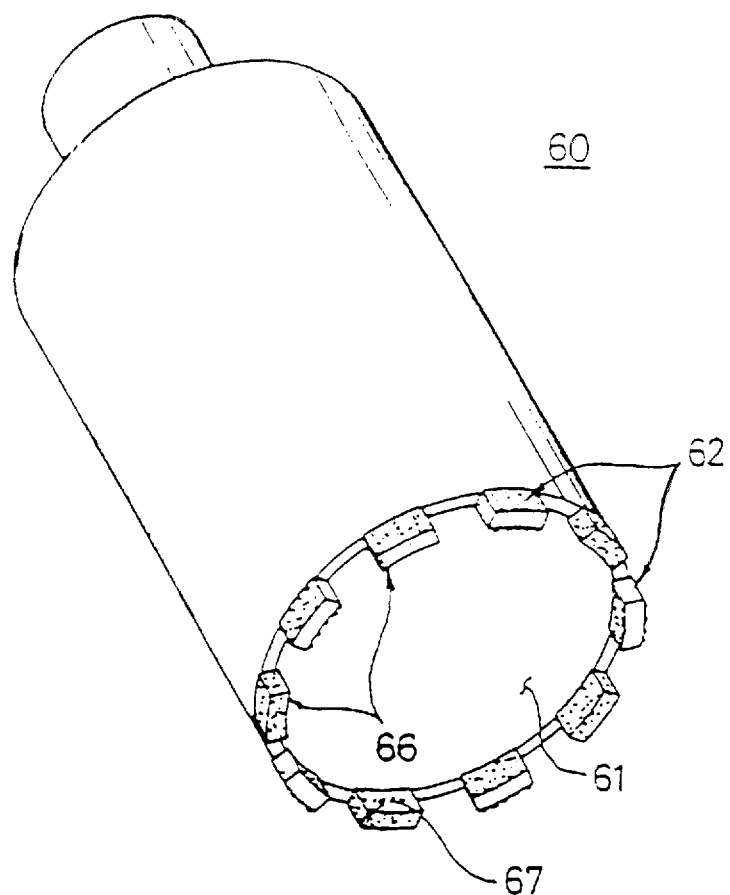
FIG. 8B is a perspective view of a diamond tool with segment type cutting tips for drilling workpieces according to the present invention, which includes the non-diamond layer cutting tips alternatively disposed together with the diamond layer cutting tips on the circumference of the wheel body.

The non-diamond portion 17 can be modified to compose of abrasive materials, metals such as cobalt, nickel, bronze, copper, etc., or resin or ceramic on the surface 56 as shown in FIGS. 8A and 8B, so that the surface of the modified non-diamond portion 17 contact and cut the workpieces.

The thin diamond layers 14 and 15 function to prevent edge area of both outer surfaces of each segment type cutting tip 12 defacing and to form two microscopic linear cutting grooves 18 and 18" in the workpieces 19 during cutting operation, as shown in FIG. 5B.

Thus, the portions 18' of workpieces 19 between the two cutting grooves 18 and 18" can be easily crushed by a small friction and a rotation impact power of the non-diamond portion 17 and thereby the non-diamond portion 17 of the segment type cutting tips 12 are able to produce cutting chips with relatively large sizes during cutting operation so that those chips are easily discharged outside with reducing the friction with the segment type cutting tip 12 of the diamond tool 10, thereby to increase a cutting rate and to prevent the chips from dispersing in the air.

Figure 6:
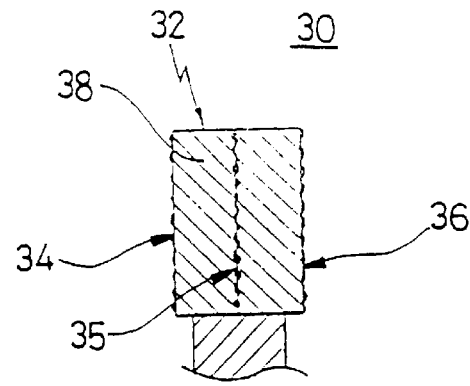
FIG. 6 is a partial cross-sectional view of a diamond tool with segment type cutting tips according to the present invention, which three diamond layers are longitudinally disposed respectively in and between both outer surfaces on the non-diamond portions, each diamond layer cutting tip thereof is disposed along the rotation direction of the diamond tool to form three microscopic linear cutting grooves in the workpieces during the cutting operation.
Figure 7:
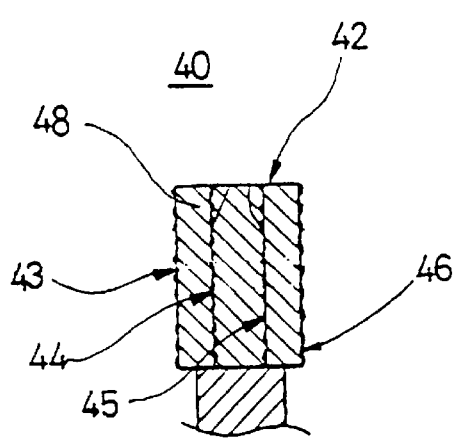
FIG. 7 is a partial cross-sectional view of a diamond tool with segment type cutting tips according to the present invention, which four diamond layers are longitudinally disposed respectively in and between both outer surfaces of the non-diamond portions, each diamond layer cutting tip thereof is formed along the rotation direction of the diamond tool to form four microscopic linear cutting grooves in the workpieces during cutting operation.

In this embodiment of the present invention, if the segment type cutting tip 12 comprises one or more thin diamond layers, as shown in FIGS. 6 and 7, another segment type cutting tips 32 or 42 can be manufactured. Here, the segment type cutting tips 32 or 42 comprises three or four thin diamond layers 34, 35, and 36, or 43, 44, 45, and 46 longitudinally disposed therein parallel with the rotation direction of the diamond tool 30 or 40 respectively to form three or four microscopic linear cutting grooves in the workpieces during cutting operation, and the non-diamond portions 38 or 48 disposed between the three or four diamond layers 34, 35, and 36, or 43, 44, 45, and 46.

In this case, portions of workpieces between the microscopic linear cutting grooves can be easily crushed by a friction and a rotation impact power smaller than that of the diamond layer cutting tip 12 having the two thin diamond layers 14 and 15.

Also, the diamond tools 50 and 60 as shown in FIGS. 8A and 8B can implemented by alternatively aligning a plurality of non-diamond layer cutting tips 56 or 66, each of which the diamond particles 57 or 67 are randomly distributed in one of both outer sides and surfaces thereof, as shown in FIGS. 8A and 8B.

Figure 9B:
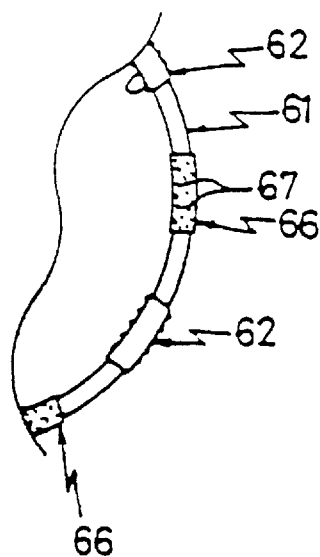
FIGS. 9A and 9B are partial side and bottom views of the diamond tools with segment type cutting tips shown in FIGS. 8A and 8B, respectively.
Figure 9A:
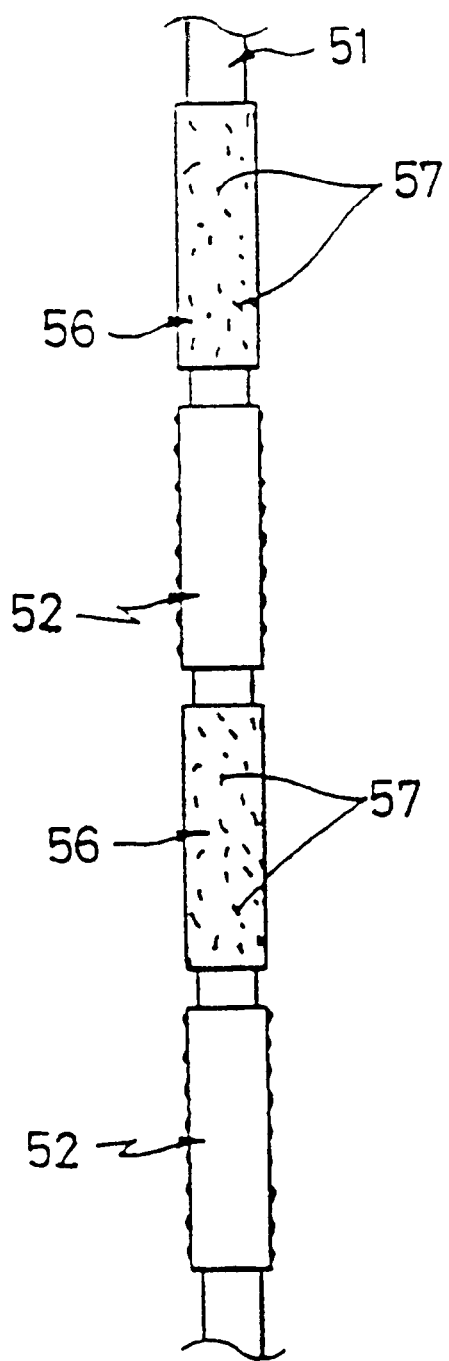

The non-diamond layer cutting tips and the diamond layer cutting tips 56 and 52, or 66 and 62 are alternatively disposed on the circumference of wheel body 51 or 61 of tool 50 or 60, as shown in FIGS. 9A and 9B.

Figure 18A:
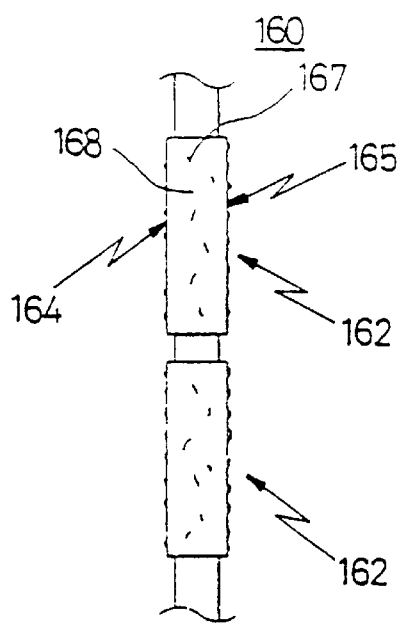
FIGS. 18A, 18B and 18C are partial side views of the diamond tool with segment type cutting tips for cutting, grinding and drilling workpieces, which in a non-diamond portion of each diamond layer cutting tip shown in FIGS. 4A, 6 and 10A.
Figure 18B:
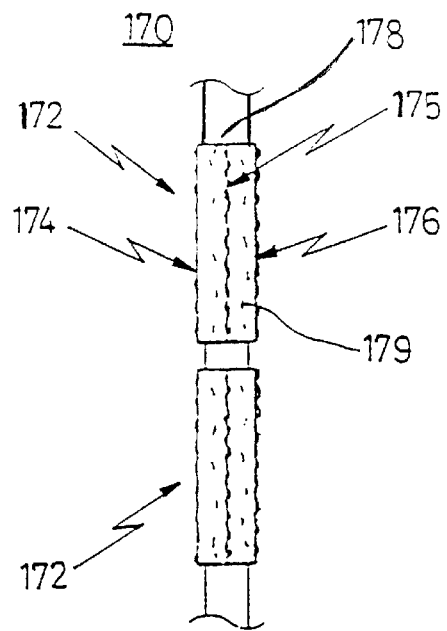

Also, as in the non-diamond portion 168 or 178 of the diamond tool 160 or 170 shown in FIGS. 18A and 18B, the diamond particles 167 or 179 can be distributed in the density lower than that of the diamond layers 164 and 165, or 174, 175 and 176 of each diamond layer cutting tips 162 or 172 or above noted non-diamond layer cutting tips 56 or 66, respectively.

Figure 10A:
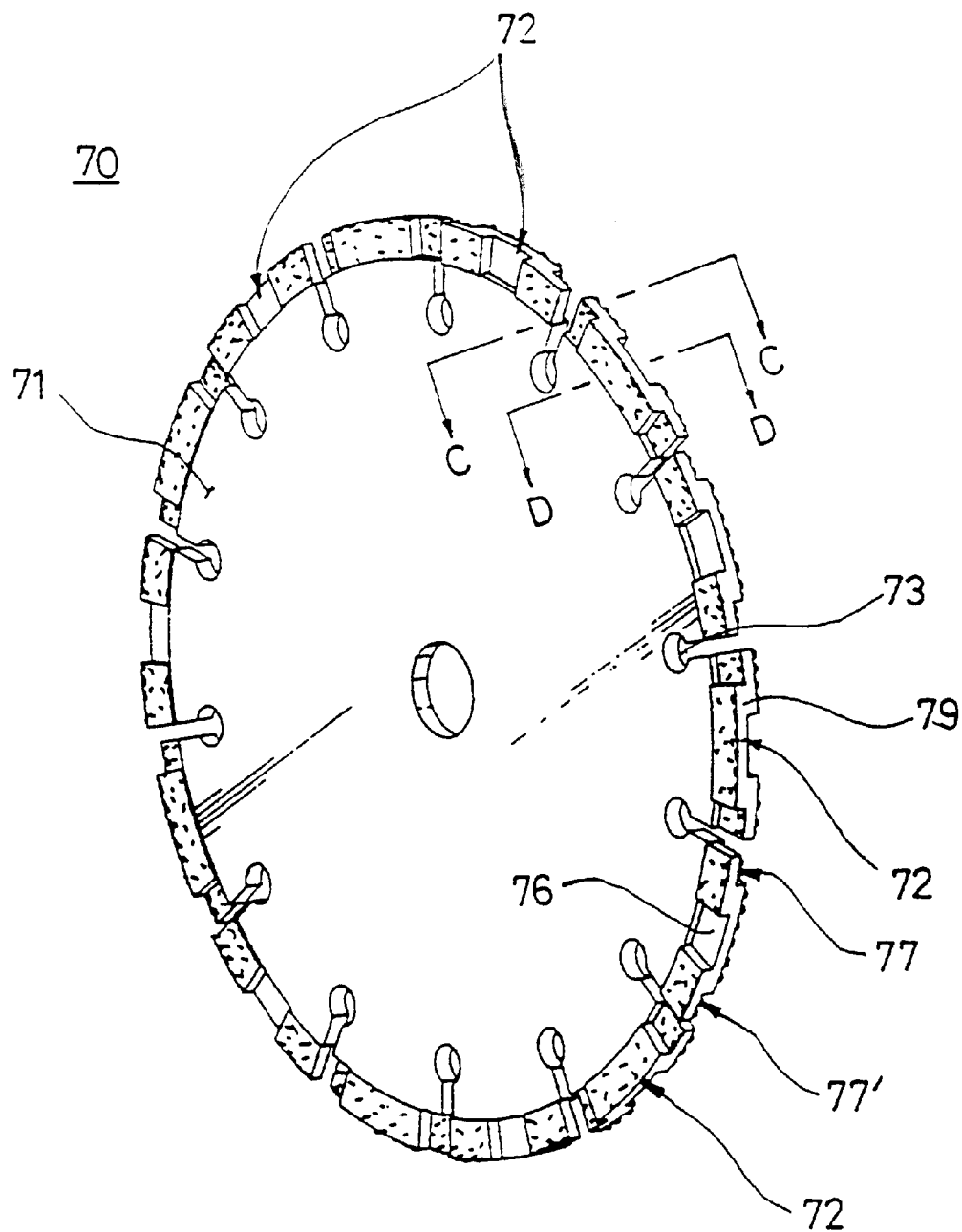
FIG. 10A is a perspective view of the diamond tool with segment type cutting tips for cutting and grinding workpieces according to the present invention, which a plurality of diamond layers are longitudinally disposed on (depressed) bottom surfaces of cutting portions of non-diamond portion and both outer surfaces of the diamond layer.
Figure 10B:
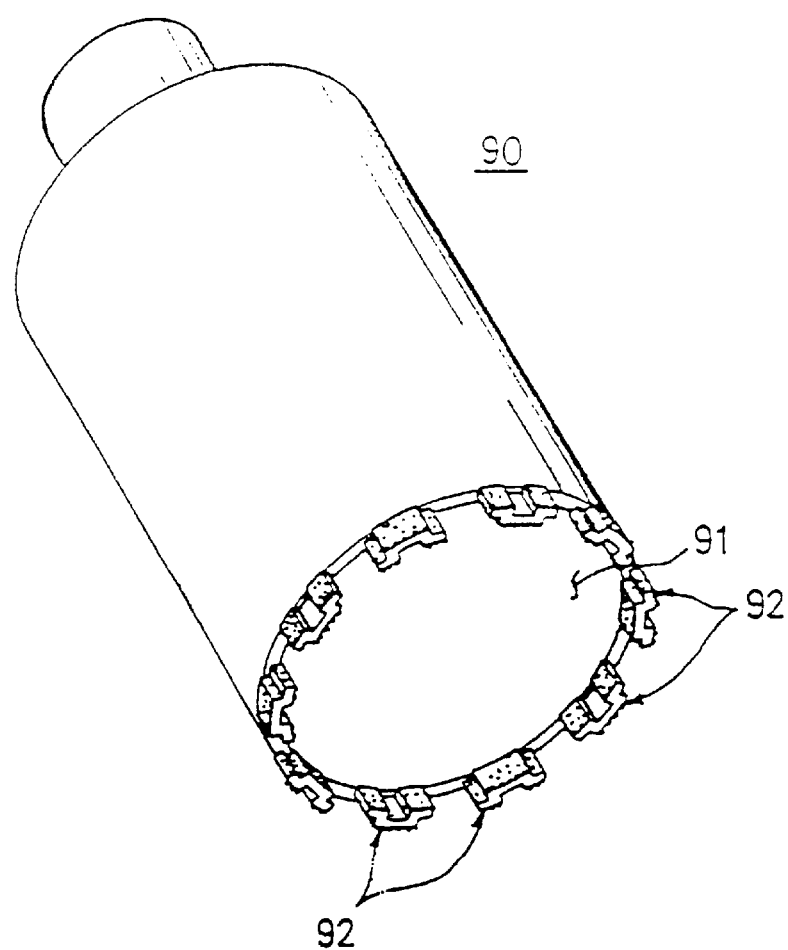
FIG. 10B is a perspective view of the diamond tool with segment type cutting tips for drilling workpiece according to the present invention, which a plurality of diamond layers are longitudinally disposed on (depressed) bottom surfaces of cutting portions of non-diamond portion and both surfaces of the diamond layer.

Referring to FIGS. 10A and 10B, there are illustrated the diamond tools 70 and 90 for cutting and drilling workpieces according to another preferred embodiment of the present invention.

In here, it is also appreciated that since each of the diamond tools 70 and 90 for cutting saw machine and core drilling machine has same structure except that the wheel bodies 71 and 91 have respectively disk and cylinder shapes.

Therefore, the diamond tool 70 for cutting saw machine will be explained as below.

The diamond tool 70 for cutting saw machine comprises a wheel body 71 connected with a shaft of an electric motor having a plurality of discharge slots 73 for receiving and discharging minute chips produced during cutting operation, and a segment type cutting tip for cutting and grinding workpieces.

The cutting tip comprises a plurality of diamond layer cutting tips 72 disposed at predetermined intervals on the circumference of wheel body 71, each of the diamond layer cutting tips 72 which include a non-diamond portion 79 having a depressed portion 76 disposed in the center of one of both outer surfaces thereof and cutting portions 77 and 77' disposed in both edges of the other surface thereof.

Figure 11:
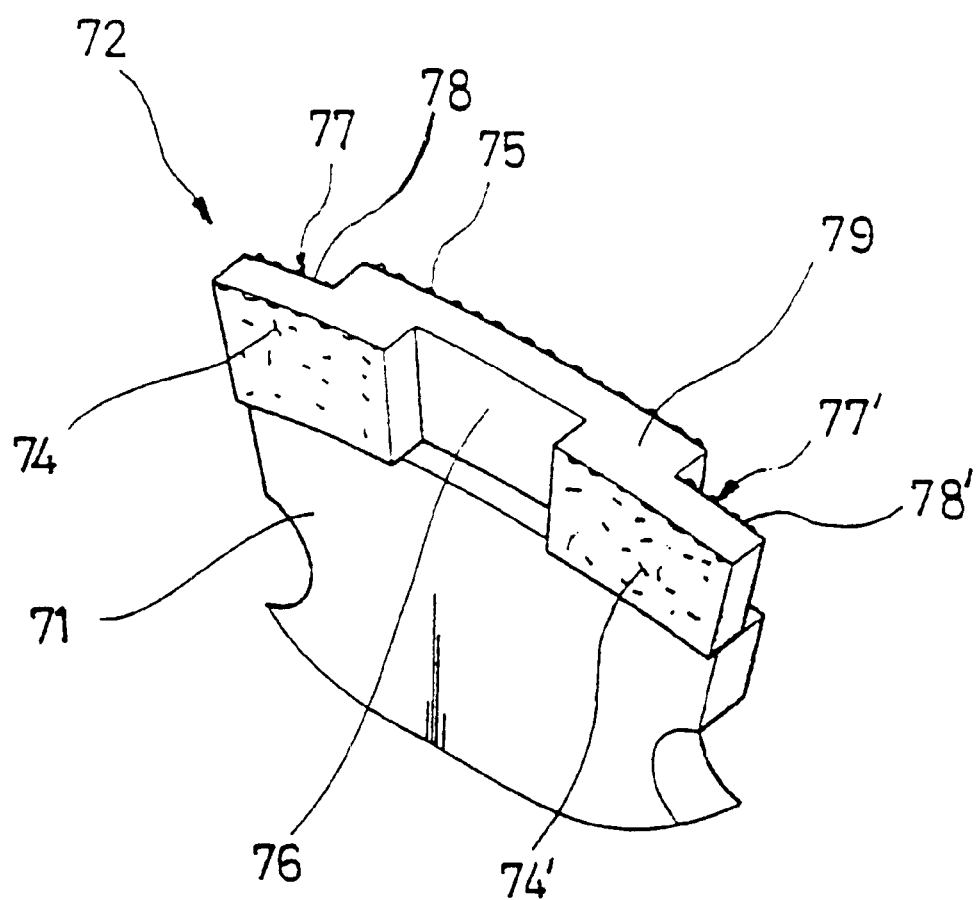
FIG. 11 is a partial perspective view of the diamond tool with segment type cutting tips shown in FIG. 10A or 10B.

Also, each of the diamond layer cutting tips 72 further includes a plurality of diamond layers 78, 78', 74, 74' and 75 longitudinally disposed parallel with the rotation direction of the tool respectively on the bottom surfaces of the cutting portions 77 and 77' of the non-diamond portion 79, and both outer surfaces of the non-diamond portion 79 divided or reduced by a depressed portion 76 and cutting portions 77 and 77', as shown in FIG. 11.

It is desirable that the area of the diamond layers 74 and 74' on one of both outer surfaces of the non-diamond portion 79 of the diamond layer cutting tips 72 is same as that of the diamond layer 75 on outer surface of the non-diamond portion 79 to keep the balance of cutting rate of both of the diamond layers 74, 74' and 75.

The bottom surfaces of the cutting portions 77 and 77' of the non-diamond portion 79 are positioned about the plane forming the center between both outer surfaces of the non-diamond portion 79 of the diamond layer cutting tip 72 to let the diamond layers 78 and 78' disposed thereon to form one microscopic linear cutting groove 82 in the workpieces 85 during the cutting operation of the tool 70, as shown in FIGS. 11, 12A, 12B and 13.

Figure 13:
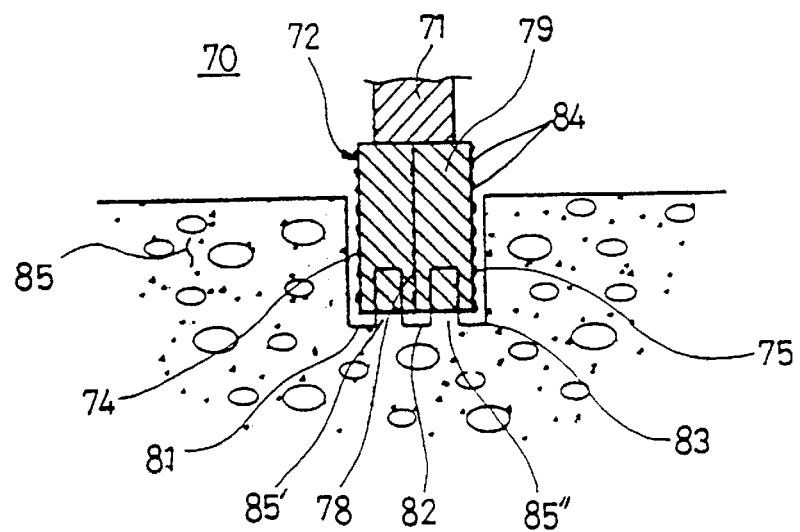
FIG. 13 is a partial cross-sectional view of the diamond tool with segment type cutting tips according to the present invention overlapping cross-section taken along line C—C and D—D of FIG. 10A when it is operating.

Thus, the diamond layers 78, 78' 74, 74' and 75 on the bottom surfaces of the cutting portions 77 and 77' of the non-diamond portion 79, and both outer surfaces of the non-diamond portion 79 of the diamond layer cutting tips 72 form three microscopic linear cutting grooves 81, 82, and 83 in the workpieces 85 to let the portions 85' and 85" of the workpieces 85 between the microscopic linear cutting grooves 81, 82, and 83 to be easily crushed by a small friction and a rotation impact power of the non-diamond portion 79 during the cutting operation of the diamond tool 70, as shown in FIG.13.

Figure 12B:
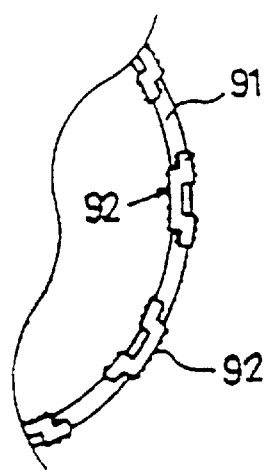
FIGS. 12A and 12B are partial side and bottom views of the diamond tools with segment type cutting tips shown in FIGS. 10A and 10B, respectively.
Figure 12A:
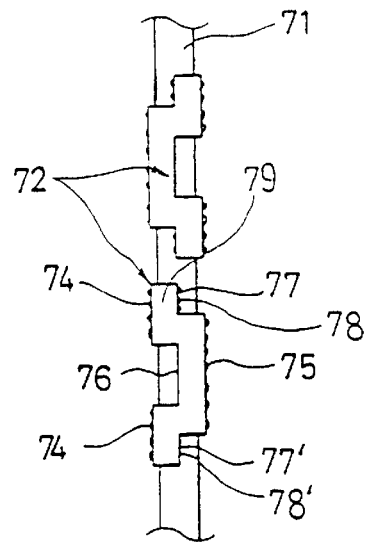

The diamond layer cutting tips 72 or 92 are disposed on the circumference of the wheel body 71 or 91 so that the depressed portion 76 and the cutting portions 77 and 77' thereof are alternatively directed to one of both outer sides, as shown in FIGS. 12A and 12B.

Figure 18C:
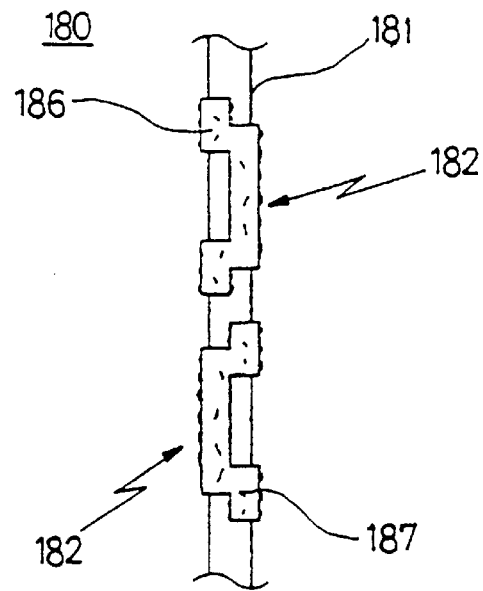

Also, as in the non-diamond portion 186 of each diamond layer cutting tip 182 of the diamond tool 180 shown in FIG. 18C, the diamond particles 187 can be distributed in the density lower than that of the diamond layers of the diamond layer cutting tips 182.

Figure 14A:
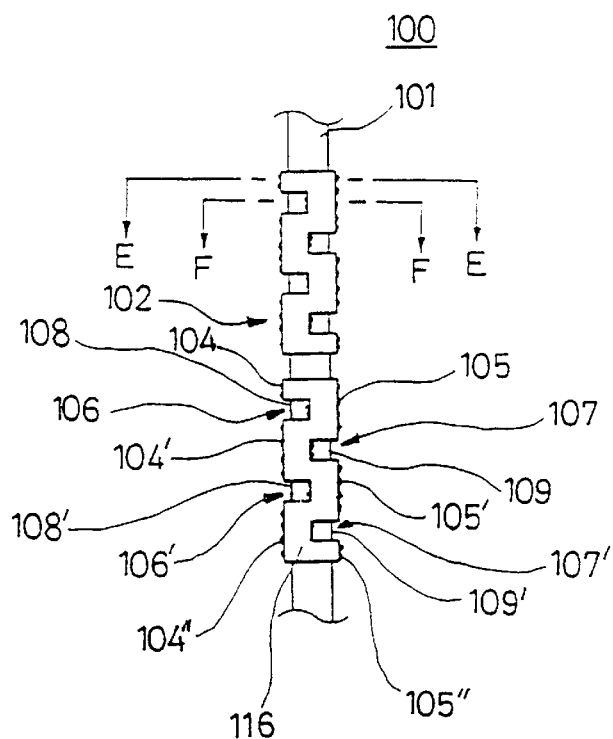
FIGS. 14A and 14B are partial side and bottom views of the diamond tools with segment type cutting tips for cutting and drilling workpieces, respectively, which have four both depressed portions disposed to cross each other at predetermined intervals both outer surfaces thereof.
Figure 14B:
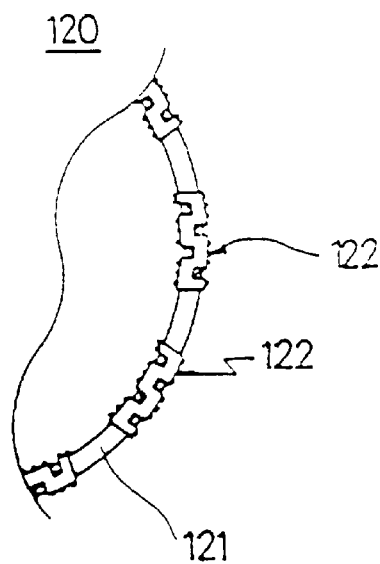

As shown in FIGS. 14A and 14B, in other embodiment of the present invention, a diamond tools 100 and 120 for use in apparatus such as cutting saw machine and core drilling machine includes respectively a segment type cutting tip for cutting and drilling workpieces comprising a plurality of diamond layer cutting tips 102 or 122 disposed at predetermined intervals on the circumference of wheel body 101 or 121.

It is also appreciated that since each of the diamond layer cutting tips 102 and 122 for cutting saw machine and core drilling machine has same structure. Therefore, the diamond layer cutting tips 102 for cutting saw machine will be explained as below.

Each of the diamond layer cutting tips 102 comprises a non-diamond portion 116 having four both depressed portions 106, 106', 107, and 107' in both outer surfaces thereof, and a plurality of diamond layers 108, 108', 109, 109', 104, 104', 104", 105, 105', and 105" longitudinally disposed parallel with the rotation direction of the diamond tool 100 respectively on the bottom surfaces of the depressed portions 106, 106', 107, and 107' of the non-diamond portion 116 and both outer surfaces of the non-diamond portion 116 of the diamond layer cutting tips 102 divided by the depressed portions 106, 106', 107, and 107' of non-diamond portion 116, as shown in FIG. 14A.

The four both depressed portions 106, 106', 107, and 107' are disposed to cross each other at predetermined intervals in both outer surfaces of the non-diamond portion 116 of the diamond layer cutting tips 102.

Figure 15:
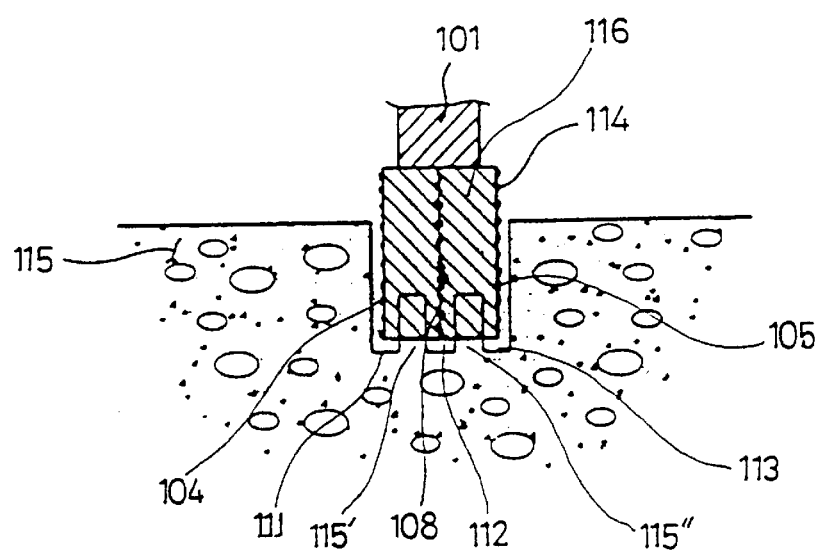
FIG. 15 is a partial cross-sectional view of the diamond tool with segment type cutting tips of the present invention overlapping cross-sections taken along lines E—E and F—F of FIG. 14A when the diamond tool is operating.

It is desirable that the depth of all the bottom surfaces of the depressed portions 106, 106', 107, and 107' of the non-diamond portion 116 is a half of the thickness of the non-diamond portion 116 of the diamond layer cutting tip 102 to let the diamond layers 108, 108', 109, and 109' disposed thereon to form one microscopic linear cutting groove 112 in the workpieces 115 during the cutting operation of the diamond tool 100, as shown in FIG.15.

Thus, a plurality of diamond layers 104, 104', 104", 105, 105', 105", 108, 108' 109, and 109' on the both outer surfaces of the non-diamond portion 116 of the diamond layer cutting tips 102 and on the bottom surfaces of the depressed portions 106, 106', 107, and 107' thereof form three microscopic linear cutting grooves 111, 112, and 113 in the workpieces 115 to let the portions 115' and 115" of the workpieces 115 between the microscopic linear cutting grooves 111, 112, and 113 to be easily crushed by a small friction and a rotation impact power of the non-diamond portions 116 during the cutting operation of the diamond tool 100, as shown in FIG.15.

Figure 16B:
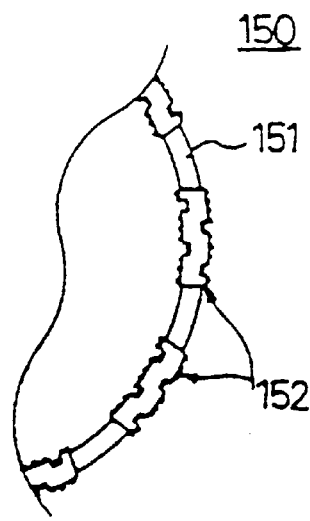
FIGS. 16A and 16B are partial side and bottom views of diamond tools with segment type cutting tips of the present invention, which the depth of bottom surfaces of depressed portions of each both outer surfaces of the non-diamond portion is less than a half of the thickness of the non-diamond portion of the diamond layer cutting tip.
Figure 16A:
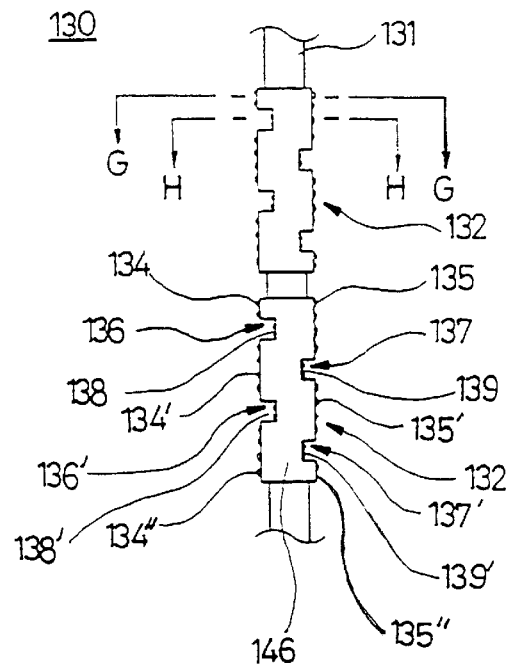
Figure 17:
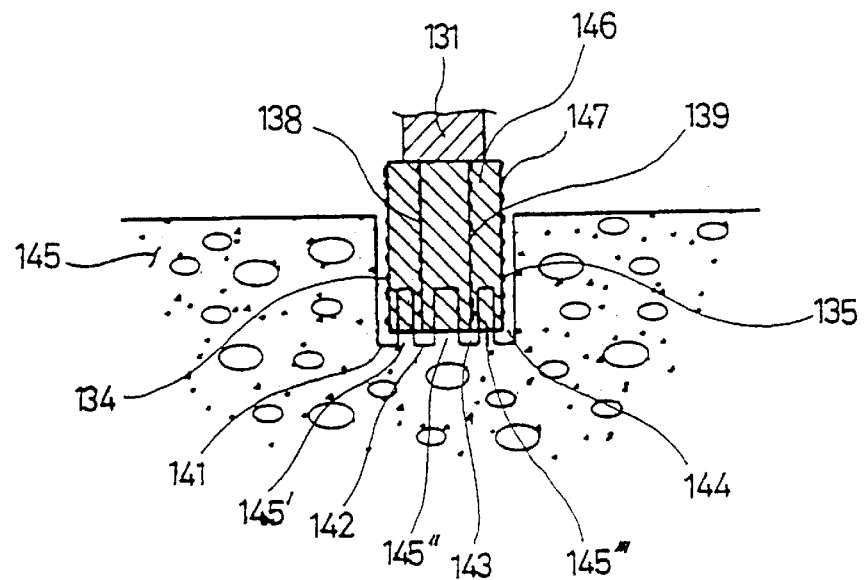
FIG. 17 is a partial cross-sectional view of the diamond tool with segment type cutting tips of the present invention overlapping cross-sections taken along lines G—G and H—H of FIG.16A when the diamond tool is operating.

Also, the depth of the bottom surfaces of the depressed portions 136, 136', 137, and 137' of each both outer surface of the non-diamond portion 146 can be less than a half of the thickness of the non-diamond portion 146 of the diamond layer cutting tip 132 to let the diamond layers 138, 138' 139, and 139' disposed thereon to form the two microscopic linear cutting grooves 142 and 143 in the workpieces 145 during the cutting operation of the diamond tool 130 or 150, as shown in FIGS. 16A, 16B and 17.

Thus, in this case, the diamond layers 134, 134', 134", 135, 135' 135", 138, 138', 139, and 139' on the both outer surfaces of the non-diamond portion 146 of each diamond layer cutting tip 132, and on the bottom surfaces of the depressed portions 136, 136', 137, and 137' thereof form four microscopic linear cutting grooves 141, 142, 143, and 144 in the workpieces 145 to let the portions 145', 145", and 145"'of the workpieces 145 between the cutting grooves 141, 142, 143, and 144 to be easily crushed by a small friction and a rotation impact power of the non-diamond portions 146 during the cutting operation of the diamond tool 130, as shown in FIG. 17.

Operation of the diamond tools for use in apparatus such as cutting saw machine and core drilling machine according to embodiments of the present invention will de described, hereinafter.

Referring to FIG. 5B, there is illustrated the operation of the diamond tool 10 of one embodiment of the present invention which the two thin diamond layers 14 and 15 are longitudinally disposed respectively in both outer surfaces of the non-diamond portion 17 of the diamond layer cutting tips 12.

At first, when the wheel body 11 is rotated by an electric motor connected with a shaft thereof to cut the workpieces 19 such as brick, concrete, granite, marble, etc., the diamond layer cutting tips 12 begin to grind workpieces 19 to form the cutting slot therein along a predetermined line.

At this time, since the thin diamond layers 14 and 15 including the diamond particles 16 are disposed in both outer surfaces of each diamond layer cutting tip 12, both edges of the diamond layer cutting tips 12 are defaced less than the center thereof and thereby the two microscopic linear cutting grooves 18 and 18" are formed in the cutting slot of the workpieces 19, as shown in FIG. 5B.

By forming the cutting grooves 18 and 18", portion 18' of the workpieces 19, the portion therebetween is weakened and easily crushed by a small friction and a rotation impact power of the non-diamond portion 17.

Thus, the non-diamond portions 17 of the diamond layer cutting tip 12 are able to produce the cutting chips with relatively large sizes, and the produced chips are easily discharged outside through the discharge slots 13 of the wheel body 11 with reducing the friction with the diamond layer cutting tip 12 of the diamond tool 10, thereby to increase cutting rate and to prevent the chips from dispersing in the air.

In this way, by repeating operations of each diamond layer cutting tip 12 of the diamond tool 10, the workpieces 19 along the predetermined line is cut.

Referring to FIGS. 13, 15 and 17, there are illustrated the operation of the diamond tools 70, 100, and 130 of other embodiments of the present invention.

The operation of these diamond tools 70, 100 and 130 is same that of the diamond tool 10 of the embodiment noted above expect for the diamond layers on both outer surfaces of the non-diamond portion, and the cutting portions or depressed portions form three or four linear cutting grooves in workpieces.

As apparent from the foregoing description, the present invention provides a diamond tool having a segment type cutting tip comprising a plurality of diamond layer cutting tips, each of which at least two diamond layers are longitudinally disposed along the rotation direction of the tool to form microscopic cutting grooves in the workpieces during the cutting operation, and thereby to cause the portions of the workpieces between the cutting grooves to be easily crushed by the non-diamond portions of the diamond layer cutting tips to enhance a cutting rate of the diamond tool. Also, the present invention provides a diamond tool having a structure which the segment type cutting tip is able to produce cutting chips with relatively large sizes during the cutting operation so that those chip are easily discharged outside to reduce the friction with the diamond layer cutting tips of the diamond tool, thereby to increase cutting rate and to prevent produces chips from dispersing in the air, and cause the bad affects to user's health and the contamination of environment.

Also, the present invention provides a diamond tool having a segment type cutting tip comprising a plurality of diamond layer cutting tips, each of which diamond particles in the diamond layer thereof are distributed in a predetermined pattern to reduce the amount of diamond particles used, thereby reducing the manufacturing cost of the diamond tool.

What is claimed is:

1. A diamond tool (10) having segmented cutting tips for cutting, grinding or drilling workpieces comprising:
    a wheel body (11) and
    a plurality of segmented cutting tips (12) disposed at periphery of the wheel body (11) cutting tip (12) including:
        diamond layers (14, 15), including diamond particles (16), which are disposed along rotation direction of the wheel body (11), to form microscopic cutting grooves (18, 18") within the workpieces (19) during cutting, grinding or drilling operation; and
    a non-diamond portion (17) disposed between the diamond layers (14, 15) to crush portions (18') of the workpieces (19) between the microscopic cutting grooves (18, 18") with relatively larger sizes as the non-diamond portion (17) applies a relatively small friction and a rotation impact to the portion (18'), wherein the non-diamond portion does not include diamond particles (16).

2. The diamond tool as claimed in claim 1, wherein the diamond particles are distributed in each diamond layer forming a pattern of grid.

3. A diamond tool (70) having segmented cutting tips for cutting, grinding or drilling workpieces (85) comprising:
    a wheel body (71); and
    a plurality of segmented cutting tips (72) disposed at a periphery of the wheel body (71), each segmented cutting tip (72) including:
        an inner non-diamond portion (79) having a depressed portion (76) depressed from one side surface thereof with a predetermined depth and with a first area, and cutting portions (77, 77') depressed from other side surface thereof with the predetermined depth and with second areas, wherein the inner non-diamond portion (79) does not include diamond particles, the depressed portion (76) and the cutting portions (77, 77') are formed to be alternatively aligned on each side surface of the non-diamond portion (79), and a summation of third areas of the one side surface, which are remaining areas by subtracting the first area from the one side surface, is the same as that of a fourth area of the other side surface, which is a remaining area by subtracting the second areas from the other side surface, wherein all directions of the first, second, third and fourth areas are parallel with rotation direction of the wheel body; and
        outer diamond layers (74, 74', 78, 78', 75) including diamond particles disposed on the third areas of the one side surface, the second areas of the cutting portions (77, 77') and the fourth area of the other side surface;
    wherein the outer diamond layers (74, 74', 78, 78', 75) form microscopic cutting grooves (81, 82, 83) within the workpieces (85), thereby producing portions (85', 85") of the workpieces (85) between the microscopic cutting grooves (81, 82, 83) during the segmented cutting tip operates, and the non-diamond portion (79) crushes the portions (85', 85") with relatively larger sizes as it applies a relatively small friction and a rotation impact thereto.

4. The diamond tools as claimed in claim 3, wherein the diamond particles are distributed in each diamond layer forming a pattern of grid.

5. A diamond tool (100; 130) having segmented cutting tips for cutting, grinding or drilling workpieces (115; 145) comprising;

a wheel body (101;131); and a plurality of segmented cutting tips (102;132) disposed at a periphery of said wheel body (101;131), each segmented type cutting tip (102;132) including:

an inner non-diamond portion (116;146) having a longitudinal axis and having a plurality of first depressed portions (106, 106'; 136,136') depressed from one side surface thereof with a predetermined depth, and a plurality of second depressed portions (107,107'; 137,137') depressed from the other side surface thereof with said predetermined depth wherein the inner non-diamond portion (116; 146) does not include diamond particles, the first depressed portions(106, 106'; 136,136') and the second depressed portions (107, 107'; 137,137') are formed to be alternatively aligned on each side surface of the non diamond portion (116; 146) with a predetermined interval there between; and outer diamond layers (108 108', 109, 109', 104, 104", 105, 105', 105"; 138, 138', 139, 139', 134, 134', 134", 135, 135', 135") including diamond particles disposed on all surfaces parallel to said longitudinal axis, the outer diamond layers (108, 108', 109, 109', 104, 104', 104", 105, 105', 105", 138, 138', 139, 139', 134, 134', 134", 135, 135', 135") form microscopic cutting grooves (111, 112, 113; 141, 142, 143, 144) to thereby produce portions (115', 115"; 145', 145", 145'") between the microscopic cutting grooves (111, 112, 113; 141, 142, 143, 144) during the operation of the segmented cutting tip (102;132), and the non-diamond portion (116; 146) crushes the portions (115', 115"; 145',145",145'") with relatively larger sizes as it applies a relatively small friction and a rotation impact thereto.

6. The diamond tool as claimed in claim 5, wherein the predetermined depth a half of the thickness of said non-diamond portion (116).

7. The diamond tool as claimed in claim 5, wherein the predetermined depth is less than a half of the thickness of said non-diamond portion (146).

8. The diamond tools as claimed in claim 5, wherein the diamond particles are distributed in each diamond layer forming a pattern of grid.

* * * * *